(12) United States Patent
Sanno et al.

(10) Patent No.: US 8,565,496 B2
(45) Date of Patent: Oct. 22, 2013

(54) IMAGE EDITING APPARATUS, IMAGE EDITING METHOD, AND COMPUTER READABLE MEDIUM

(75) Inventors: Masato Sanno, Tokyo (JP); Atsushi Inagaki, Yokohama (JP); Hitoshi Ikeda, Kawasaki (JP); Yuichi Nakase, Tokyo (JP); Chiyumi Niwa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1049 days.

(21) Appl. No.: 12/356,941

(22) Filed: Jan. 21, 2009

(65) Prior Publication Data

US 2009/0185744 A1 Jul. 23, 2009

(30) Foreign Application Priority Data

Jan. 22, 2008 (JP) ................................. 2008-011946

(51) Int. Cl.
*G06K 9/00* (2006.01)
(52) U.S. Cl.
USPC ........... 382/118; 382/115; 382/117; 382/103; 382/203; 348/231.6; 348/E5.024; 348/E5.047
(58) Field of Classification Search
USPC ................. 382/103, 203, 173, 115, 117–118; 348/231.6, E5.024, E5.041, E5.047, 348/E9.052
See application file for complete search history.

(56) References Cited

U.S. PATENT DOCUMENTS

| 2006/0227385 A1* | 10/2006 | Kawada | 358/302 |
| 2008/0013787 A1* | 1/2008 | Kobayashi | 382/103 |
| 2008/0144890 A1* | 6/2008 | Ogawa | 382/118 |

FOREIGN PATENT DOCUMENTS

JP 2006-279643 10/2006

* cited by examiner

*Primary Examiner* — Ruiping Li
(74) *Attorney, Agent, or Firm* — Canon USA Inc IP Division

(57) ABSTRACT

An image editing apparatus includes a subject information extracting unit configured to extract subject information of a subject from an image, and a subject frame setting unit configured to set a subject frame based on the subject information extracted by the subject information extracting unit. The image editing apparatus also includes a region instructions detecting unit configured to detect a user's instructions as to a region of the subject frame set by the subject frame setting unit, and a region instructions frame setting unit configured to set a region instructions frame based on the user's instructions detected by the region instructions detecting unit. The image editing apparatus further includes a storage processing unit configured to store the subject frame set by the subject frame setting unit, and the region instructions frame set by the region instructions frame setting unit, in a correlated manner.

13 Claims, 10 Drawing Sheets

IMAGE EDITING APPARATUS, IMAGE EDITING METHOD, AND COMPUTER READABLE MEDIUM

BACKGROUND OF THE INVENTION

1. Field of the Invention

The present invention generally relates to an image editing apparatus, image editing method, and computer readable medium.

2. Description of the Related Art

With image editing apparatuses according to the related art, image editing apparatuses have been known whereby a part of a still image can be trimmed and stored as a new additional image (see Japanese Patent Laid-Open No. 2006-279643). Such image editing apparatuses include an image editing apparatus wherein trimming range candidates are set and displayed as to a region extracted beforehand from a subject, such that a user can readily determine a region to be saved. Subsequently, the user can determine an arbitrary trimming position from the trimming range candidates to save this as a new additional image.

Note however, with the related art, modifying the set trimming range candidate to obtain an actual trimming range prevents the user from selecting the trimming range set for the first time. Therefore, in a case wherein the user changes the position or size of the trimming range to an unintended position or size accidentally, even if the user attempts to restore the trimming range candidate set for the first time, it cannot be restored. Accordingly, the image editing apparatus according to the related art has a problem in that operability to instruct a region, such as in trimming and so forth, is poor.

Also, a user-friendly operating environment has not been provided for displaying of a subject frame analyzed and extracted from an image, and displaying of a frame manually set by a user deforming a subject frame, or the like.

SUMMARY OF THE INVENTION

According to an aspect of the present invention, an embodiment of an image editing apparatus includes a subject information extracting unit configured to extract subject information of a subject from an image, and a subject frame setting unit configured to set a subject frame based on the subject information extracted by the subject information extracting unit. The image editing apparatus also includes a region instructions detecting unit configured to detect a user's instructions as to a region of the subject frame set by the subject frame setting unit, and a region instructions frame setting unit configured to set a region instructions frame based on the user's instructions detected by the region instructions detecting unit. The image editing apparatus further includes a storage processing unit configured to store the subject frame set by the subject frame setting unit, and the region instructions frame set by the region instructions frame setting unit, in a correlated manner.

Further features of the present invention will become apparent from the following description of exemplary embodiments with reference to the attached drawings.

DESCRIPTION OF THE EMBODIMENTS

Specific embodiments of the present invention will be described below with reference to the appended drawings. With the embodiments described below, a digital camera serving as an image editing apparatus will be described as an example.

Configuration of a Digital Camera

Figure 1:
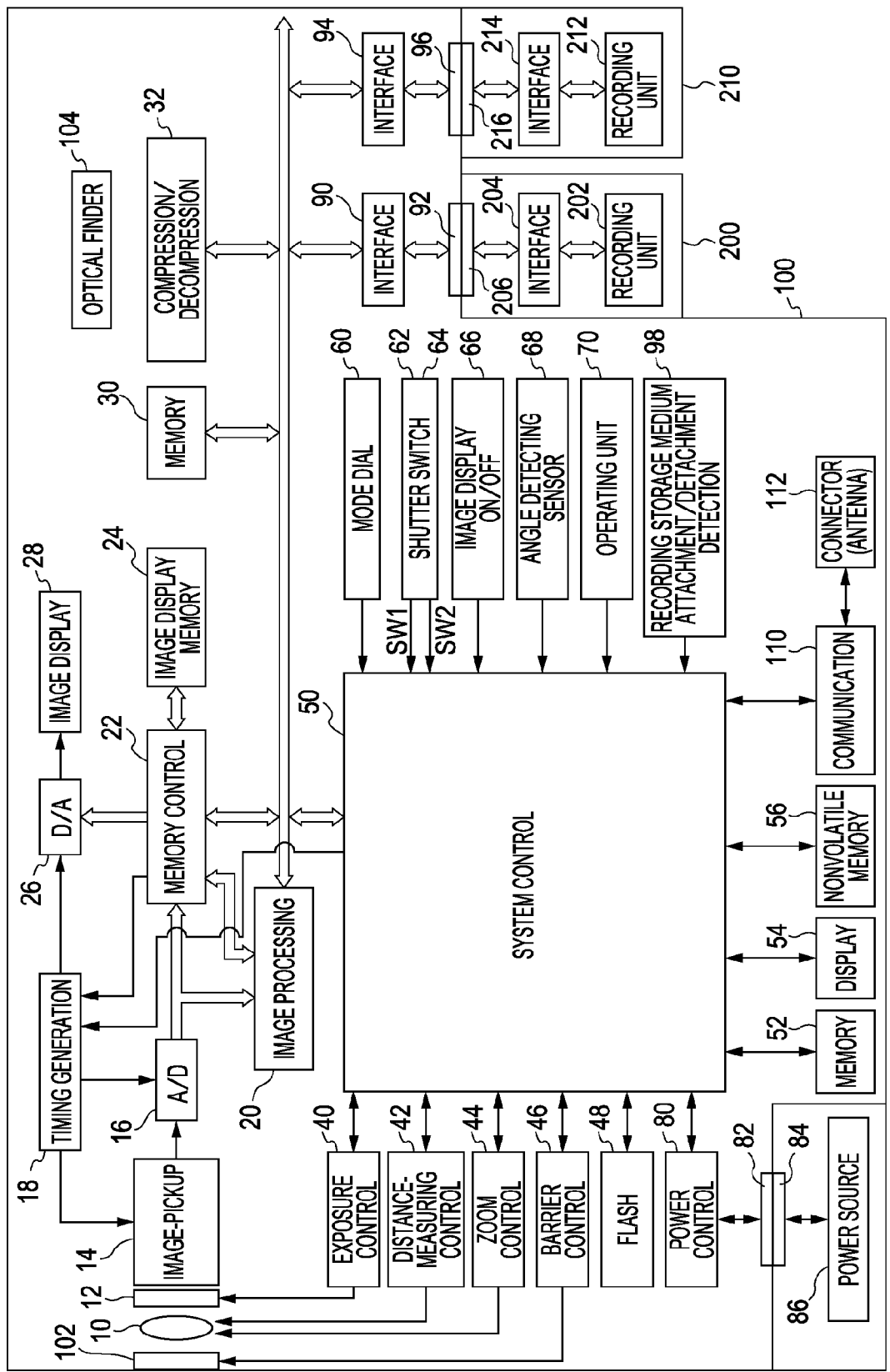
FIG. 1 is a block diagram illustrating an embodiment of a configuration of a digital camera serving as an image editing apparatus.

FIG. 1 is a block diagram illustrating a configuration of a digital camera according to a first embodiment. According to this embodiment, a digital camera 100 is configured so as to take images of a subject image through an optical system 10 serving as an image-pickup lens. The optical system 10 is configured so as to include, for example, a zoom lens of which the image-pickup field angle can be changed, and so forth. The digital camera 100 is configured so as to perform optical zoom serving as an optical zoom function by employing a zoom lens. Also, the digital camera 100 is configured so as to perform electronic zoom serving as an electronic zoom function by electronically trimming an image taken by employing an image pickup device 14.

Note that the digital camera 100 according to this embodiment may be configured so as to perform any one of optical zoom and electronic zoom. Also, the digital camera 100 may be configured such that the optical system 10 is interchangeable. In a case wherein the optical system 10 is interchangeable, an electric signal is transmitted to the digital camera 100 from a zoom control unit 44 of the digital camera 100, thereby enabling a driving mechanism within the optical system 10 to drive a zoom lens, and realizing a zoom function. Also, a driving mechanism for mechanically driving a zoom lens within the optical system 10 may be provided in the digital camera 100.

A ray input from within an optical field angle from a subject, passing through the optical system 10, forms an optical image of the subject on an image-pickup face of the image pickup device 14 through an aperture of a shutter 12 having a diaphragm function. The image pickup device 14 converts an optical image formed on the image-pickup face into an electric analog image signal, and outputs the signal.

The image pickup device 14 may comprise, for example, a CCD sensor, CMOS sensor, or the like.

An A/D converter 16 converts an analog image signal provided from the image pickup device 14 into a digital image signal. The image pickup device 14 and A/D converter 16 may be controlled by a clock signal or control signal supplied from a timing generating circuit 18.

The timing generating circuit 18 supplies a clock signal and control signal to the image pickup device 14, A/D converter 16, and D/A converter 26. The timing generating circuit 18 may be controlled by a memory control unit 22 and system control unit 50.

An image processing unit 20 performs image processing such as pixel interpolation processing, color conversion processing, or the like, upon image data (digital image signal) output from the A/D converter 16, or image data supplied from the memory control unit 22. Also, the image processing unit 20 may calculate data employed for AF (autofocus) processing employing a TTL (through the lens) method, AE (automatic exposure) processing, and EF processing (automatic exposure employing pre-flash), based on image data taken by the image pickup device 14. The image processing unit 20 may provide the data obtained through the calculation to the system control unit 50. The later-described system control unit 50 controls an exposure control unit 40, and distance-measuring control unit 42 (AF control unit), based on this data, and thus may realize automatic exposure, and autofocus functions. Also, the image processing unit 20 may execute AWB (auto white balance) processing employing the TTL method based on image data taken by the image pickup device 14.

The memory control unit 22 controls the A/D converter 16, timing generating circuit 18, image processing unit 20, image display memory 24, D/A converter 26, memory 30, and compression/decompression unit 32. The image data output from the A/D converter 16 may be written in the image display memory 24 or memory 30 through the image processing unit 20 and memory control unit 22, or directly through the memory control unit 22 without passing through the image processing unit 20. Image data for display written in the image display memory 24 is converted into an analog image signal for display by the D/A converter 26, and supplied to the image display unit 28, whereby the taken image is displayed on the image display unit 28. Also, an electronic viewfinder (EVF) function can be realized by displaying taken images on the image display unit 28 consecutively. The image display unit 28 can turn on/off arbitrarily in accordance with instructions from the system control unit 50. Turning off the display of the image display unit 28 enables the power consumption of the digital camera 100 to be reduced.

The memory 30 stores taken still images and moving images (e.g., as images to be recorded in a storage medium). While the capacity and access speed (writing speed, reading speed) of the memory 30 may be designed relatively arbitrarily, in order to record continuous taken images and panoramic taken images, wherein multiple still images are taken consecutively, a corresponding capacity and access speed may have to be employed. Note that the memory 30 may also be employed as a work area of the system control unit 50.

The compression/decompression unit 32 may be, for example, a circuit for compressing/decompressing image data by employing adaptive discrete cosine transform (ADCT), or the like. The compression/decompression unit 32 is configured so as to read in image data stored in the memory 30 to perform compression processing or decompression processing, and write the image data subjected to processing in the memory 30.

The exposure control unit 40 controls the shutter 12 having an aperture function based on the information supplied from the system control unit 50. Also, the exposure control unit 40 provides a flash exposure function by cooperating with a flash 48 (e.g., a light-emitting apparatus). The flash 48 provides a flash exposure function, and light emission function for AF auxiliary light. That is to say, the flash 48 projects light at the time of shooting in a dark place, such as indoors or the like, or projects AF auxiliary light.

The distance-measuring control unit 42 controls a focusing lens of the optical system 10 based on the information provided from the system control unit 50. A zoom control unit 44 controls zooming of the optical system 10. A barrier control unit 46 controls operation of a barrier 102 protecting the optical system 10. The system control unit 50 may control the entire digital camera 100.

Memory 52 stores, for example, constants, variables, programs for operation of the system control unit 50, object data for displaying an object on the image display unit 28, and so forth. The object data is data that is different from image data generated by taking images, and may have been written in the memory 52 before the shipment of the digital camera 100. A memory area where the object data is stored is a memory area that is different from a memory area temporarily storing image data. Note that the digital camera 100 may be configured such that the object data can be rewritten by the user based on data to be downloaded through an electric communication line, or data stored in a storage medium after the shipment. Also, an arrangement may be made wherein the object data can be rewritten by a service center or the like.

A display unit 54 is configured of, for example, an LCD or LED. The display unit 54 may be made up of a single or multiple elements, and is provided in an appropriate position of the digital camera 100. A part of the display elements making up the display unit 54 may be disposed within an optical finder 104. The system control unit 50 may output an operation state, message, or the like on the display unit 54 by employing characters, image, or the like in accordance with execution of the program. Here, examples of information to be displayed on the display unit 54, such as on an LCD or the like, may include, for example, a display of single shot/continuous taken images, a display of self-timer, a display of a compression rate, a display of the number of recording pixels, a display of the number of recording sheets, a display of the number of remaining sheets to be shot, and a display of shutter speed. Also, examples of the information may include a display of aperture value, a display of exposure correction, a display of flash, a display of red-eye reduction, a display of macro taken images, a display of buzzer setting, a display of remaining battery for clock, a display of remaining battery, an error display, and an information display by employing a multiple-digit number. Further, examples of the information may include a mounted state of storage media 200 and 210, an operation display of a communication interface 110, and a date and time display. Of the information to be displayed on the display unit 54, examples of the information to be displayed within the optical finder 104 may include a display of focusing, a display of shaking warning, a display of flash charging, a display of shutter speed, a display of aperture value, and a display of exposure correction.

Nonvolatile memory 56 is memory capable of eliminating/recording electrically, for example, such as EEPROM or the like. For example, the above-mentioned object data may be stored in the nonvolatile memory 56.

The mode dial 60 is a dial for setting (switching) the state of the digital camera 100 to, for example, "image-pickup mode", "playback mode", "PC connection mode", or the like.

A first shutter switch 62 (hereafter, referred to as "SW1") is turned on during an operation (e.g., half-pressing) of the shutter button, and instructs the system control unit 50 to start, for example, the AF processing, AE processing, AWB processing, EF processing, or the like.

A second shutter switch 64 (hereafter, referred to as "SW2") is turned on when an operation (e.g., full-pressing) of the shutter button is completed. The SW2 reads out an image signal from the image pickup device 14 to convert this into digital image data at the A/D converter 16, and then processes the image data at the image processing unit 20, and instructs the system control unit 50 to start processing for writing the image data in the memory 30. Also, the SW2 reads out the image data from the memory 30 to compress the image data at the compression/decompression unit 32, and instructs the system control unit 50 to start a series of processing (image-pickup processing) including processing for writing the compressed image data in the storage media 200 and 210.

An image display on/off switch 66 sets on/off of display at the image display unit 28. An angle detection sensor 68 detects an inclination angle of the digital camera 100. For example, the angle detection sensor 68 may detect whether the digital camera 100 is in a horizontal state, or in a state of being rotated 90 degrees to either the left or right.

An operating unit 70 comprises, for example, various types of buttons, a touch panel, and so forth, and may be configured so as to include, for example, a menu button, set button, macro button, multi-screen playback page-break button, flash setting button, single shot/continuous shots/self-timer changeover button, and so forth. Also, the operating unit 70 may be configured so as to include, for example, a menu movement + (plus) button, menu movement − (minus) button, playback image movement + (plus) button, playback image − (minus) button, shooting image quality selection button, exposure correction button, date/time setting button, and so forth. The operating unit employed for the present embodiment will be described later with reference to FIG. 2.

A power control unit 80 is configured so as to include, for example, a power detection circuit, DC-DC converter, switch circuit for switching a block to be turned on, and so forth. The power control unit 80 detects, for example, whether power is turned on/off, the type of power, and remaining battery life, and may control the DC-DC converter according to the detection results and instructions from the system control unit 50, and may also supply power to each block as appropriate.

A power source 86 may be, for example, a primary battery such as an alkaline battery, lithium battery, or the like, secondary battery such as NiCd battery, NiMH battery, Li battery, or the like, AC adapter, or the like.

The main unit of the digital camera 100 and power source 86 includes connectors 82 and 84, respectively. The main unit of the digital camera 100 and power source 86 are connected through the connectors 82 and 84, respectively.

The storage media 200 and 210 may be, for example, semiconductor memory, hard disk, or the like. In the embodiment as shown, the storage media 200 and 210 are configured so as to include storage units 202 and 212, and interfaces 204 and 214, respectively. The storage media 200 and 210 are connected through the connectors 206 and 216, and the connectors 92 and 96 of the main unit of the digital camera 100. Also, the storage media 200 and 212 connected to the main unit of the digital camera 100 are connected to the bus within the digital camera 100 through the interfaces 90 and 94 of the digital camera 100.

A storage medium attachment/detachment detecting unit 98 detects whether or not the storage media 200 and 210 are connected to the connectors 92 and 96. Note that description has been made assuming that the digital camera 100 shown in FIG. 1 includes two systems of the interfaces and connectors for attaching a storage medium, but the camera may include a single system, or may include three or more systems. In the case of providing interfaces and connectors of multiple systems, these may have mutually different specifications.

Also, as such an interface and connector, there may be employed an interface and connector conforming to a standard such as a PCMCIA card or CF (Compact Flash (registered trademark) card, or the like. In the case of employing an interface and connector conforming to a standard such as a PCMCIA card or CF card, or the like, as the interfaces 90 and 94 and connectors 92 and 96, image data, and management information accompanied with image data, can be transferred with an external apparatus by employing a card enumerated below, or the like. The card thereof may include various types of card, including a communication card such as a LAN card, modem card, USB card, IEEE1394 card, P1284 card, SCSI card, PHS, or the like. Also, the external apparatus mentioned here may be peripheral equipment, such as for example, a computer, printer, or the like.

The optical finder 104 is a window provided for focusing, or determining a picture composition. The user can perform the taking of images without employing the EVF function according to the image display unit 28, by performing the taking of images employing the optical finder 104. As described above, there may be disposed therein display elements making up a part of the display unit 54, e.g., display elements for performing display of focusing, a display of shaking warning, a display of flash charging, a display of shutter speed, a display of aperture value, a display of exposure correction, and so forth.

The communication interface 110 provides various types of communication function, such as for example USB, IEEE1394, P1284, SCSI, modem, LAN, RS232C, wireless communication, or the like. The communication interface 110 is connected to a connector 112 for connecting the digital camera 100 and another external apparatus. Note that, when providing a wireless communication function, the communication interface 110 is connected to an antenna instead of the connector 112.

Figure 2:
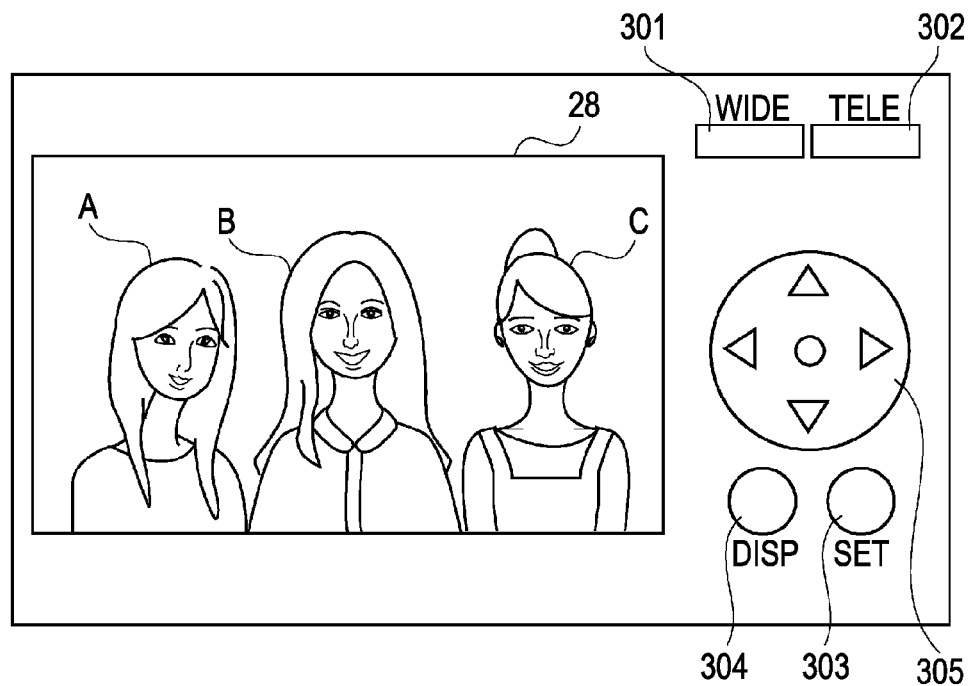
FIG. 2 is an external view illustrating the rear side of the embodiment of the digital camera serving as an image editing apparatus.

Next, the operating unit 70 shown in FIG. 1 will be described with reference to FIG. 2. FIG. 2 is an external view illustrating the rear face of the embodiment of the digital camera 100. As shown in FIG. 2, with the digital camera 100, a WIDE button 301, TELE button 302, Set button 303, Disp button 304, cross key button 305, and so forth, are provided as parts of the operating unit 70. Also, an LCD display serving as the image display unit 28 for displaying taken image data, and an operating situation, is provided on the rear face of the digital camera 100. Image data wherein three persons A, B and C are projected is displayed on the image display unit 28 shown in FIG. 2.

Flow of Editing Processing

Next, an example of operation processing of the digital camera 100 according to the first embodiment will be described with reference to the flowcharts shown in FIGS. 3 and 6. With the present embodiment, region instructions will be described with reference to a case wherein a trimming function is employed, which saves a region instructed by region instructions as image data. According to this operation processing example, when the trimming function is selected by the user employing the operating unit 70, the system control unit 50 of the digital camera 100 starts operation processing.

Figure 3:
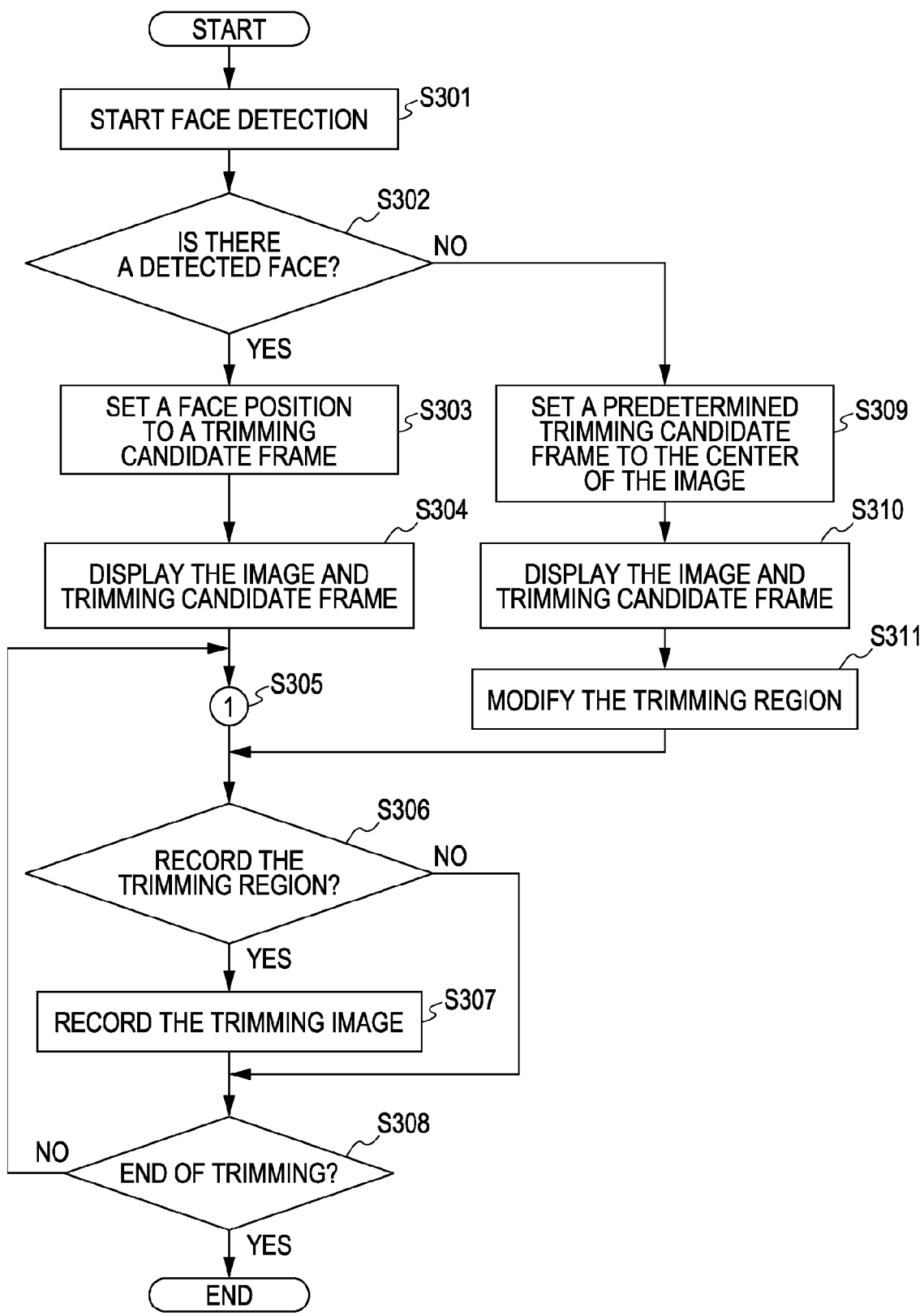
FIG. 3 is a flowchart illustrating an embodiment of image editing operation processing.

First, in step S301 of the flowchart shown in FIG. 3, the system control unit 50 analyzes an image to be subjected to region instructions, and starts face detection (e.g., performs the function of a subject information extracting unit). The system control unit 50 determines whether a face region exists that corresponds to a detected face. Examples of a face detection method include a method employing a known Gabor wavelet transform and graph matching.

In step S302, the system control unit 50 determines whether or not a person's face has been detected. In a case wherein a person's face has not been detected (NO in step S302), the system control unit 50 advances the processing to step S309. In a case wherein a person's face has been detected (YES in step S302), the system control unit 50 advances the processing to step S303. In a case wherein face region information detected by the digital camera at the time of shooting has been recorded in a correlated manner with the image, instead of face detection by analysis of the image, the face region information may be read out to detect the position of a face region.

In step S303, the system control unit 50 sets each of face positions to a trimming candidate frame based on the subject information (e.g., face information) of the detected person's faces (e.g., performs the function of a subject frame setting unit). The subject information mentioned here may include, for example, the coordinate values of a rectangle indicating a person's face region with an image. Also, the trimming candidate frame mentioned here is a frame to become a candidate for trimming, i.e., a trimming frame (e.g., subject frame) automatically set based on the face detection processing performed by the system control unit 50. To describe the setting of a trimming candidate frame more specifically, the system control unit 50 generates a frame, as a trimming candidate frame, of which the size is enlarged up to predetermined values in the horizontal direction and vertical direction (e.g., 300% in the horizontal direction, 200% in the vertical direction) with the detected face region as the center. Note that in the case that multiple faces are detected, the system control unit 50 generates a trimming candidate frame each time a face is detected. The system control unit 50 stores the generated trimming candidate frame, for example, in the memory 30.

Figure 4:
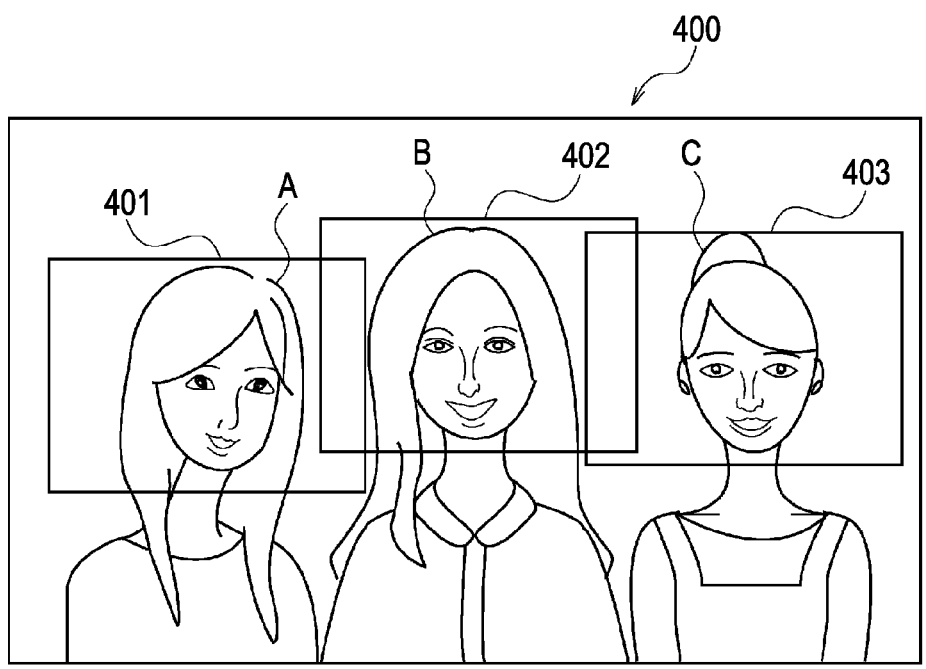
FIG. 4 is a diagram illustrating an example of a state in which trimming candidate frames have been set.

FIG. 4 is a diagram illustrating a state in which the system control unit 50 has set trimming candidate frames in the image data shown in FIG. 2. As shown in FIG. 4, the system control unit 50 sets persons A through C to trimming candidate frames 401 through 403, respectively.

In step S304, the system control unit 50 displays the target image and the set trimming candidate frames on the image display unit 28 (display control unit). In this processing example, the image and trimming candidate frames that the system control unit 50 displays on the image display unit 28 may be the same as those shown in FIG. 4. After displaying those on the image display unit 28, the system control unit 50 advances the processing to step S305.

Figure 5:
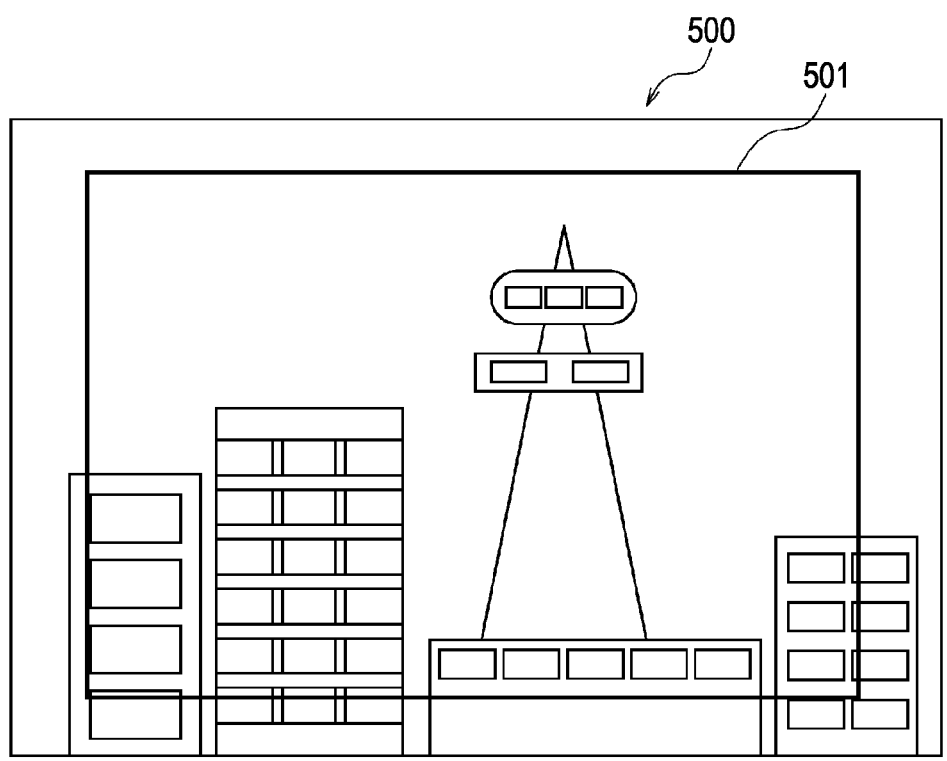
FIG. 5 is a diagram illustrating an example of an image which does not include a person.

Now, description will be made regarding a case wherein a person's face has not been detected in step S302 (NO in step S302). Image data shown in FIG. 5 will be described as an example of an image where a person's face has not been detected. An image 500 shown in FIG. 5 is an image where buildings and scenery and so forth are taken, and which does not include a person. Note that a case is regarded as an image not including a person when the system control unit 50 fails to detect a face region from an image, such as for example a case wherein a person is projected, but the person is small, a case wherein a person is projected, but the person turns around, or the like.

First, in step S309, the system control unit 50 sets the center of the target image to a trimming candidate frame having a predetermined size. As shown in FIG. 5, the system control unit 50 sets the center of the target image 500 to a trimming candidate frame 501.

In step S310, the system control unit 50 displays the target image and the set trimming candidate frame on the image display unit 28. Here, the target image and trimming candidate 501, which the system control unit 50 displays on the image display unit 28, are the same as those shown in FIG. 5.

In step S311, the user performs modification of the trimming region indicated with a trimming candidate frame displayed on the image display unit 28. The system control unit 50 detects an operation for modifying the trimming region to modify the trimming region, and advances the processing to step S306.

Next, the processing in step S305 will be described with reference to the flowchart shown in FIG. 6. FIG. 6 is a flowchart illustrating an example of processing wherein the system control unit 50 detects instructions for the trimming region of a trimming candidate frame from the user employing the operating unit 70 shown in FIG. 2, and modifies the trimming region thereof. First, the system control unit 50 sets the detected faces or the set trimming candidate frames to numbers, respectively. For example, as shown in FIG. 4, the system control unit 50 sets a person A's face or trimming candidate frame 401 displayed on the image display unit 28 as a first trimming candidate frame. Also, the system control unit 50 sets a person B's face or trimming candidate frame 402 as a second trimming candidate frame. Also, the system control unit 50 sets a person C's face or trimming candidate frame 403 as a third trimming candidate frame.

First, in step S401, the system control unit 50 sets N to 1.

In step S402, the system control unit 50 determines whether or not an N'th trimming candidate frame exists. Note that, in a case wherein the system control unit 50 performs the processing in step S402 for the first time, the value of N is set to 1, so the system control unit 50 determines whether or not there the first trimming candidate frame exists. In a case wherein the N'th trimming candidate frame exists (YES in step S402), the system control unit 50 advances the processing to step S403. In a case wherein there is no N'th trimming candidate frame (NO in step S402), the system control unit 50 ends the processing in FIG. 6.

In step S403, the system control unit 50 displays the N'th trimming candidate frame on the image display unit 28, so as to distinguish that the N'th trimming candidate frame is in a selected state. To display the trimming candidate frame so as to distinguish that the trimming candidate frame is in a selected state, the trimming candidate frame may be displayed, for example with a heavy frame, or with a color different from other trimming candidate frames, or the like. Now, description will be made regarding a case wherein the trimming candidate frame is displayed with a heavy frame.

Figure 7:
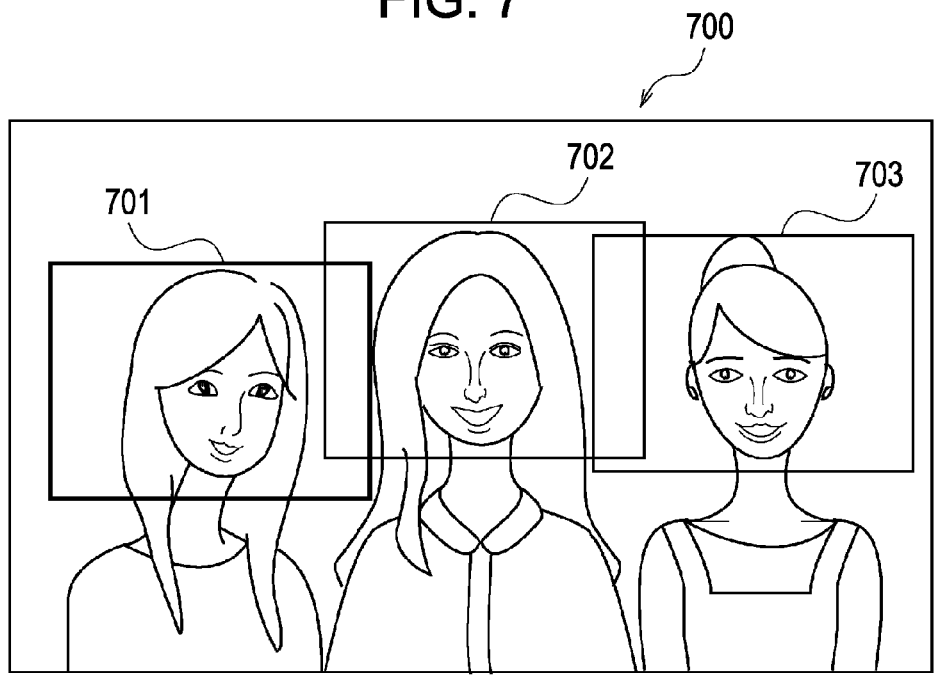
FIG. 7 is a diagram illustrating an example of a state in which a trimming candidate frame has been selected.
Figure 8:
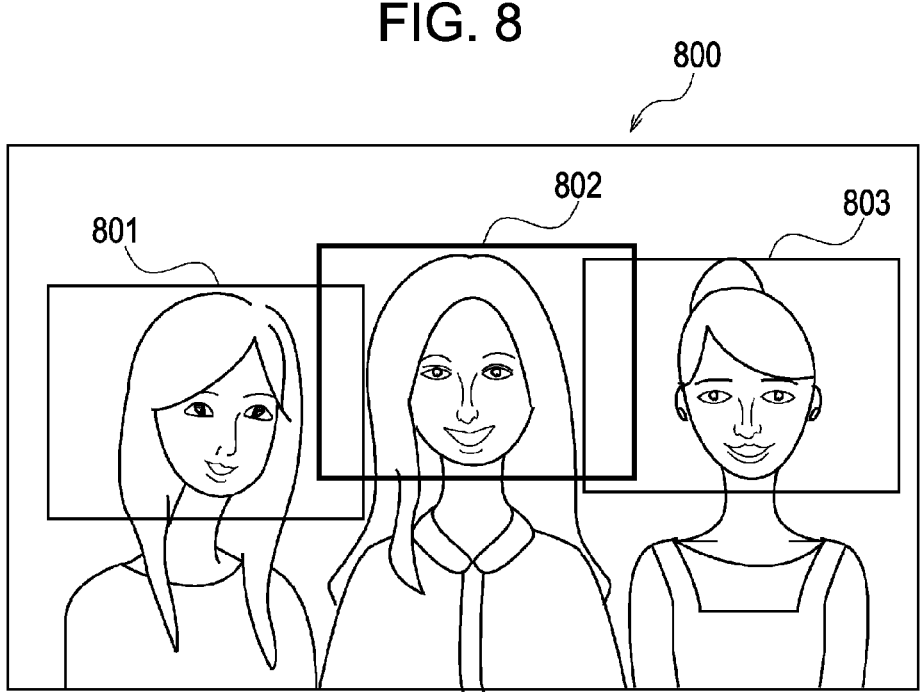
FIG. 8 is a diagram illustrating an example of a state in which a trimming candidate frame has been selected.
Figure 9:
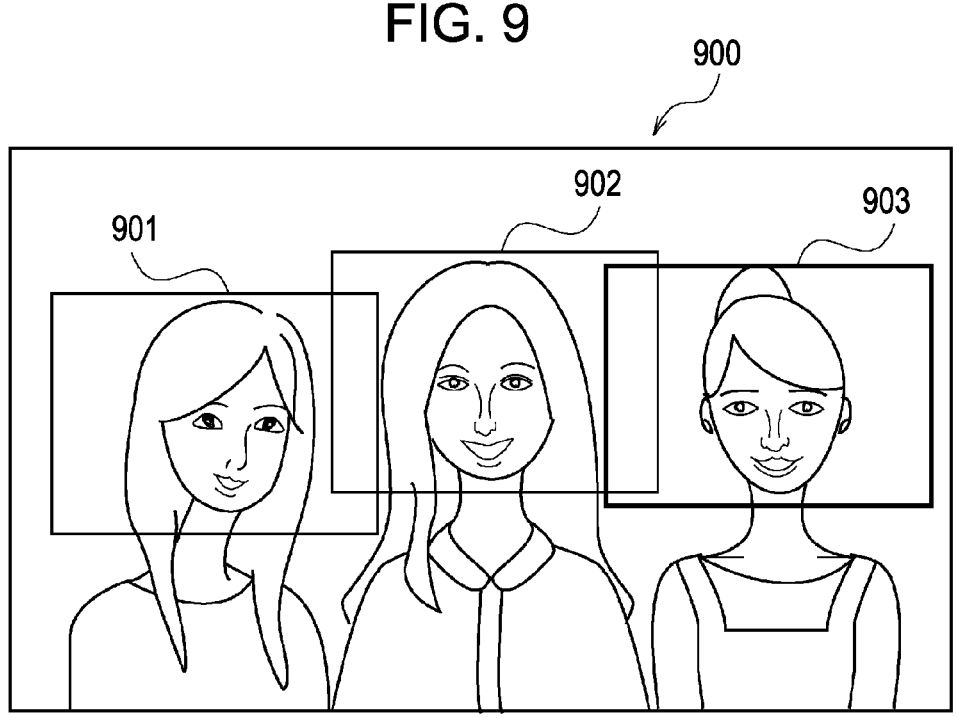
FIG. 9 is a diagram illustrating an example of a state in which a trimming candidate frame has been selected.

Reference numeral 700 in FIG. 7, 800 in FIG. 8, and 900 in FIG. 9, all denote the same image. Also, reference numerals 701 through 703 in FIG. 7, 801 through 803 in FIG. 8, and 901 through 903 in FIG. 9, all denote trimming candidate frames. For example, in a case wherein the first trimming candidate frame has been set, as shown for example in FIG. 7, the system control unit 50 displays the trimming candidate frame 701 that is set as the first with a heavy frame. In a case wherein the second trimming candidate frame has been set, as shown in FIG. 8, the system control unit 50 displays the trimming candidate frame 802 with a heavy frame. In a case wherein the third trimming candidate frame has been set, as shown in FIG. 9, the system control unit 50 displays the trimming candidate frame 903 with a heavy frame.

In step S404, the system control unit 50 determines whether or not the trimming candidate frame displayed in the selected state has been determined as the trimming region, without change thereof. Here, determination regarding whether or not the selected trimming candidate frame has been determined as the trimming region without change is performed depending on, for example, whether or not the system control unit 50 detects pressing of the Set button 303 by the user. In the case of determining that the selected trimming candidate frame has been determined as the trimming region (YES in step S404), the system control unit 50 ends the processing of the flowchart shown in FIG. 6, and returns to the processing of the flowchart shown in FIG. 3. In the case of determining that the selected trimming candidate frame has not been determined as the trimming region (NO in step S404), the system control unit 50 advances the processing to step S405.

In step S405, the system control unit 50 detects the selected trimming candidate frame (e.g., performs the function of a subject frame selecting unit), and determines whether or not modification instructions for the trimming region of the selected trimming candidate frame have been detected (e.g., performed the function of a region instructions detecting unit). Here, the determination regarding whether or not modification instructions for the trimming region of the selected trimming candidate frame have been detected is performed depending on, for example, whether or not the system control unit 50 detects pressing of the WIDE button 301, TELE button 302, or cross key button 305 by the user. For example, in a case wherein the user intends to trim a face surrounded with the N'th trimming candidate frame, or the like, and in a case wherein the user intends to modify the trimming region of the trimming candidate frame thereof, the user operates the operating unit 70 to instruct modification of the trimming region. In a case wherein region modification instructions have not been detected (NO in steps S405), the system control unit 50 advances the processing to step S406. Note that the case wherein region modification instructions have not been detected includes a case wherein no modification instructions have been performed though the system control unit 50 has waited for a predetermined period, as well as a case wherein the user specifies that the position and size of the trimming candidate frame are not modified. In a case wherein region modification instructions have been detected (YES in step S405), the system control unit 50 advances the processing to step S412.

Figure 10:
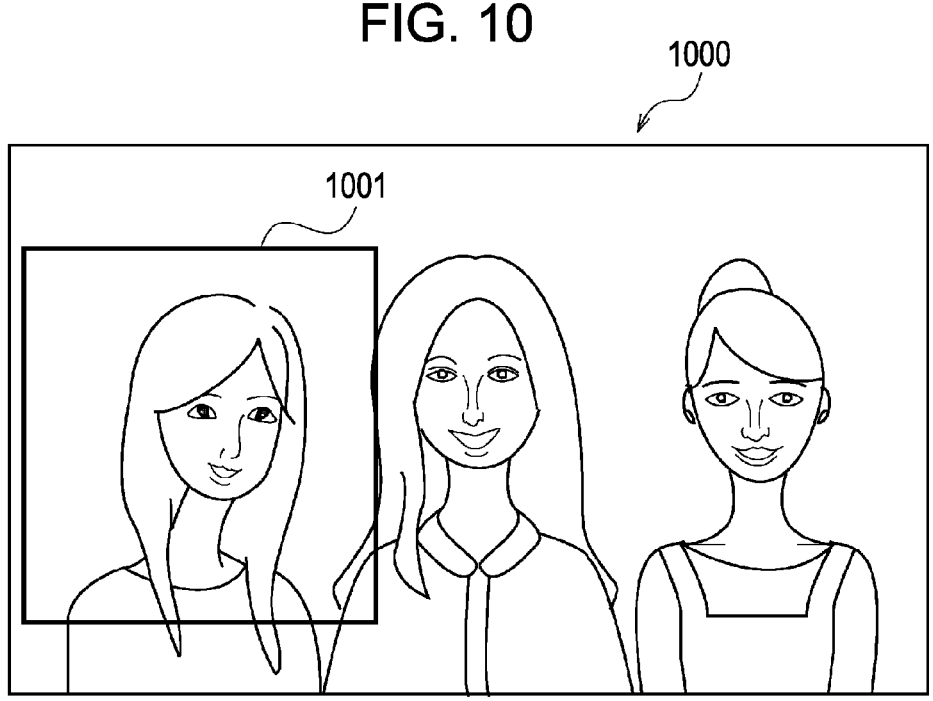
FIG. 10 is a diagram illustrating an example of a state in which a trimming region of a trimming candidate frame has been modified.

In step S412, the system control unit 50 performs processing for additionally setting a trimming frame (e.g., region instructions frame) (e.g., performs the function of a region instructions frame setting unit). More specifically, the system control unit 50 may modify at least one of the size and position of the region according to the user operations, and may store the obtained new trimming frame, for example, in the memory 30, in a correlated manner with the original trimming candidate frame. For example, in the case of detecting pressing of the TELE button 302 by the user, the system control unit 50 may perform processing for reducing the trimming candidate frame. Further, in the case of detecting pressing of the cross key button 305 by the user, the system control unit 50 may perform processing for moving the trimming candidate frame. For example, as shown in FIG. 7, the trimming candidate frame 701 set as the first can be set to a trimming frame 1001 such as shown in FIG. 10. Note that reference numeral 1000 in FIG. 10 denotes the same image as 700 in FIG. 7. According to this processing example, in the case of modifying the trimming region of a single trimming candidate frame, the system control unit 50 may eliminate the other trimming candidate frames. Also, the system control unit 50 may store the newly set trimming frame, for example, in the memory 30, in a correlated manner with the N'th trimming candidate frame (e.g., performs the function of a storage processing unit). At this time, the system control unit 50 may set the newly set trimming frame to, for example, a number from 1, and may store the newly set trimming frame. In a case wherein the trimming frame has already been stored as the first trimming frame, the system control unit 50 may set the trimming frame as the second trimming frame, and store the second trimming frame. It can be understood that the system control unit 50 recognizes that the number 1 of the trimming candidate frame and the number 1 of the trimming frame are different frames, even though both have the same number.

In step S406, the user performs operations for selecting a different trimming frame. When detecting selection by the user (e.g., performing the function of a selection detecting unit), the system control unit 50 determines whether or not a trimming frame correlated with the N'th trimming candidate frame is stored. In a case wherein a trimming frame correlated with the N'th trimming candidate frame is not stored (NO in step S406), the system control unit 50 advances the processing to step S414. In a case wherein a trimming frame correlated with the N'th trimming candidate frame is stored (Yes in step S406), the system control unit 50 advances the processing to step S407.

In step S407, the system control unit 50 sets Nx to 1.

Next, in step S408, the system control unit 50 determines whether or not the Nx'th trimming frame correlated with the N'th trimming candidate frame is stored (e.g., performs the function of a determining unit). In a case wherein the Nx'th trimming frame is stored (YES in step S408), the system control unit 50 automatically advances the processing to step S409. Subsequently, the system control unit 50 displays the trimming frame correlated with the trimming candidate frame. In a case wherein multiple trimming frames are stored, the stored trimming frames may be sequentially switched and displayed either automatically or according to the user's operations. In a case wherein the Nx'th trimming frame correlated with the N'th trimming candidate frame is not stored (NO in step S408), the system control unit 50 advances the processing to step S414. In step S414, the system control unit 50 returns the processing to step S402 in order to display the next trimming candidate frame in a selected state by adding 1 to the N.

Figure 11:
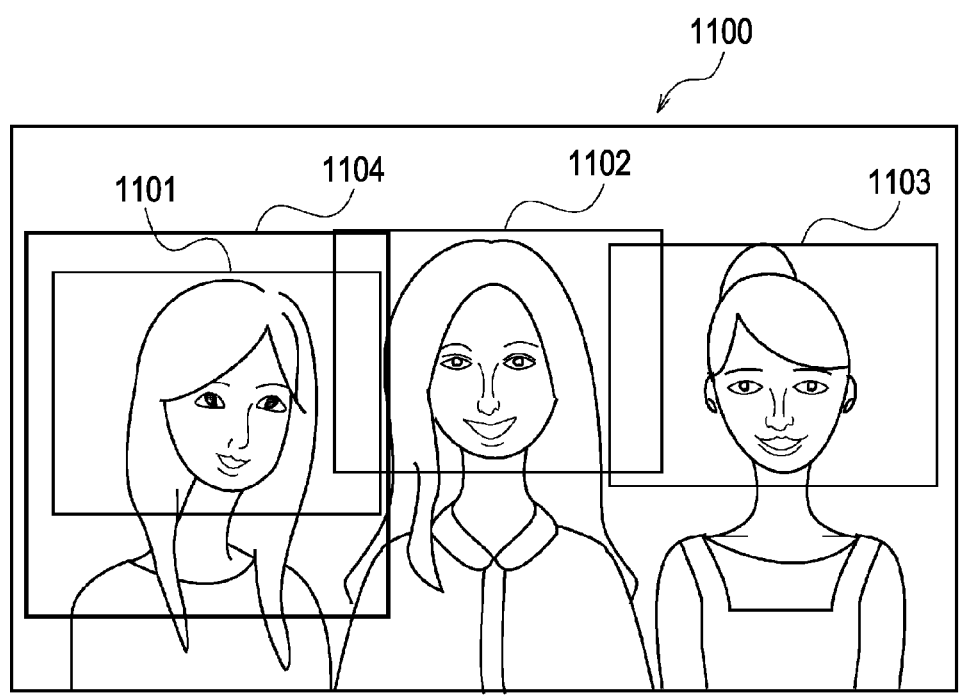
FIG. 11 is a diagram illustrating an example of a state in which trimming candidate frames and a trimming frame have been displayed.

In step S409, the system control unit 50 displays the Nx'th trimming frame correlated with the N'th trimming candidate frame in a selected state (e.g., performs the function of a display control unit). For example, in a case wherein 1 is set as the N, as shown in FIG. 11, the system control unit 50 displays the trimming frame 1104 correlated with the first trimming candidate frame 1101 in a selected state. Note that reference numeral 1100 in FIG. 11 denotes the same image as with 700 in FIG. 7. Also, reference numerals 1101 through 1103 in FIG. 11 denote the same trimming candidate frames as 701 through 703 in FIG. 7.

In step S410, the system control unit 50 determines whether or not modification of the trimming region of the selected trimming frame has been detected (e.g., performs the function of a modification detecting unit). This processing may be the same as the processing in step S405. In a case wherein modification has not been detected (NO in step S410), the system control unit 50 advances the processing to step S411. In a case wherein modification has been detected (YES in step S410), the system control unit 50 advances the processing to step S413.

In step S413, the system control unit 50 modifies the trimming frame displayed in a selected state, i.e., modifies the size or position of the trimming region of the Nx'th trimming frame, according to the user's operations, and updates this to store the modified trimming frame, for example, in the memory 30 (e.g., performs the function of a storage processing unit).

In step S411, the system control unit 50 determines whether or not the trimming frame displayed in a selected state has been determined as the trimming region. This processing may be the same as the processing in step S405. In the case of determining that the selected trimming frame has been determined as the trimming region (YES in step S411), the system control unit 50 ends the processing of the flowchart shown in FIG. 6, and returns to the processing of the flowchart shown in FIG. 3. In the case of determining that the selected trimming frame has not been determined as the trimming region (NO in step S411), the system control unit 50 advances the processing to step S415.

In step S415, the system control unit 50 adds 1 to the Nx, and advances the processing to step S408. In step S408, the system control unit 50 determines whether or not the next trimming frame is stored, i.e., whether or not the Nx'th trimming frame is stored in a correlated manner with the N'th trimming candidate frame. In a case wherein the next trimming frame correlated with the N'th trimming candidate frame is stored (YES in step S408), the system control unit 50 advances the processing to step S409, and displays the next trimming frame in a selected state. Also, in a case wherein the next trimming frame is not stored (NO in step S408), the system control unit 50 advances the processing to step S414, and performs processing for displaying the next trimming candidate frame in a selected manner.

Figure 6:
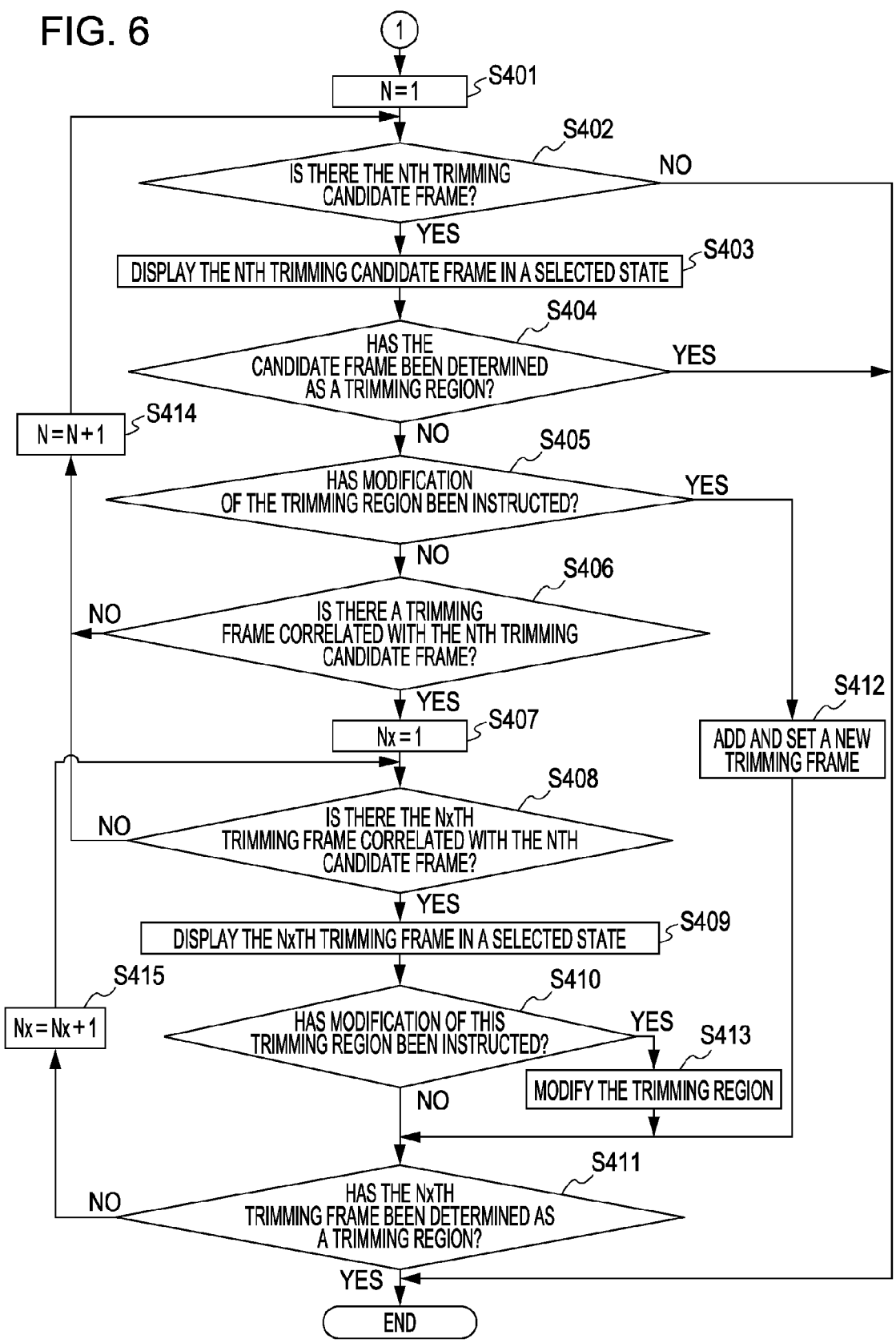
FIG. 6 is a flowchart illustrating image editing operation processing according to a first embodiment.

Upon the flowchart shown in FIG. 6 being ended, the system control unit 50 advances the processing to step S306 of the flowchart shown in FIG. 3.

In step S306, the system control unit 50 determines whether or not an image is newly recorded in the trimming region of the determined trimming frame. In the case of determining that an image is newly recorded (YES in step S306), the system control unit 50 advances the processing to step S307. In the case of determining that an image is not newly recorded (NO in step S306), the system control unit 50 advances the processing to step S308. Here, the system control unit 50 makes a determination by detecting whether the user has selected recording of a new image or cancellation of recording of a new image through the operating unit 70.

In step S307, the system control unit 50 records the trimming region of the determined trimming frame in the storage medium 200 or the like as a new image file, and advances the processing to step S308.

In step S308, the system control unit 50 determines whether or not selection of end of the trimming function has been detected. In a case wherein selection of end of the trimming function has been detected (YES in step S308), the system control unit 50 ends the operation processing of the trimming function. In a case wherein selection of end of the trimming function has not been detected (NO in step S308_, the system control unit 50 advances the processing to step S305, and can modify the trimming region of the determined trimming frame.

Thus, according to the present embodiment, the system control unit 50 stores the trimming candidate frame and the trimming frame of which the trimming region of the trimming candidate frame has been modified, in a correlated manner. Accordingly, in a case wherein the trimming frame of which the trimming region has been modified by the user from the trimming candidate frame does not satisfy the user, the user can modify the trimming region thereof again by employing the trimming candidate frame that is stored in the correlated manner with the trimming frame thereof.

Also, after displaying the trimming candidate frame in a selected manner, the system control unit 50 may display the trimming frame stored in a correlated manner with the trimming candidate frame in a selected manner, according to selection of display of the trimming frame by the user. Accordingly, the user can readily distinguish the trimming frame that is correlated with the trimming candidate frame. In other words, the present embodiment provides an improvement in the operability of instructing for a region for a subject frame.

Figure 12:
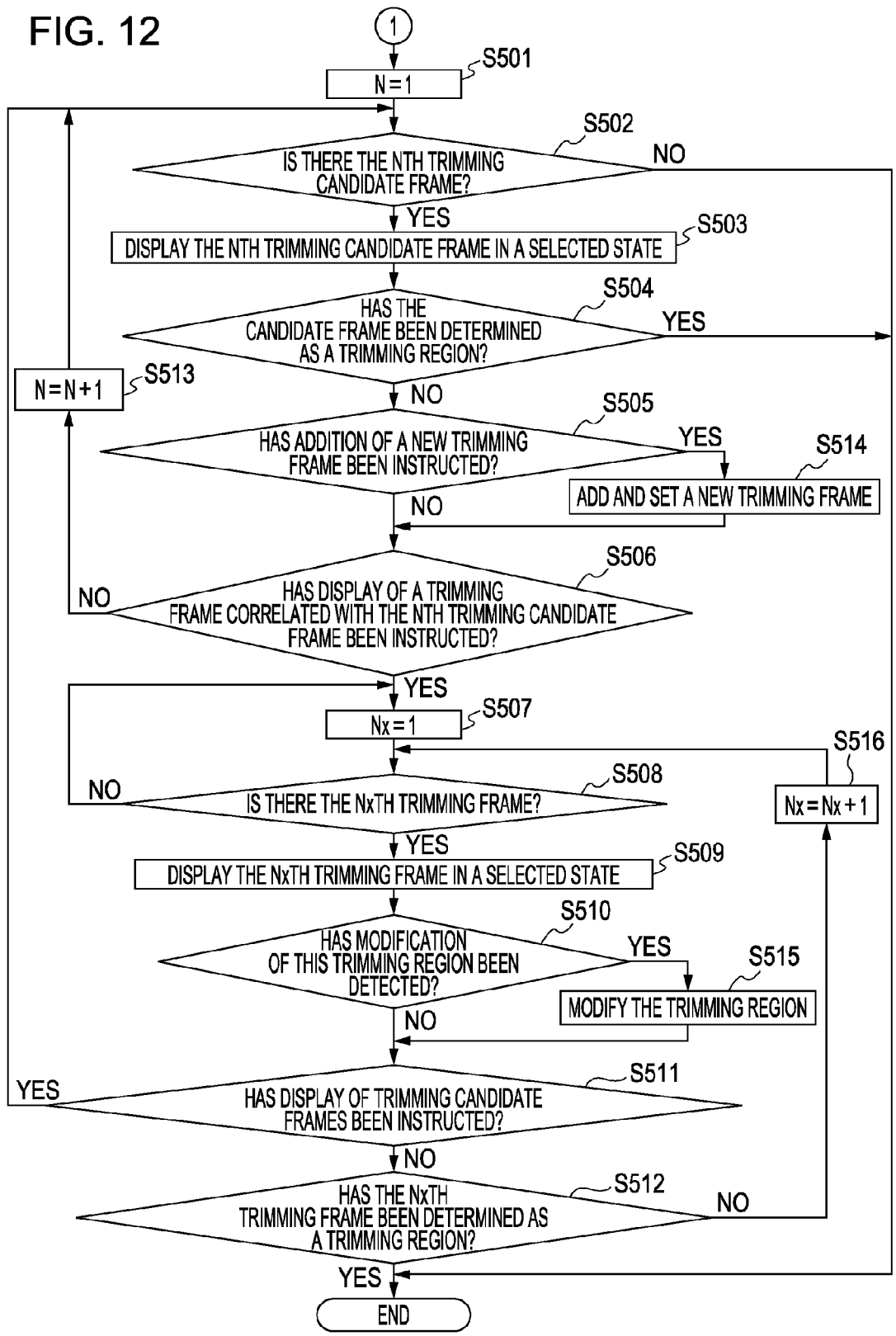
FIG. 12 is a flowchart illustrating image editing operation processing according to a second embodiment.

Next, description will be made regarding the operation processing of a digital camera 100 according to a second embodiment, with reference to the flowcharts shown in FIGS. 3 and 12. Description will be made by omitting processing that is the same as that in the first embodiment.

The flowchart shown in FIG. 3 is the same flowchart as that in the first embodiment, and further description thereof is therefore being omitted. With the flowchart shown in FIG. 12, steps S501 through S504 are the same as steps S401 through S404 shown in FIG. 6 in the first embodiment respectively, and thus further description thereof is also being omitted.

In step S505, the system control unit 50 determines whether or not addition instructions by the user for a trimming frame have been detected with respect to the trimming candidate frame displayed in the selected state. In a case wherein addition instructions have been detected (YES in step S505), the system control unit 50 advances the processing to step S514. In a case wherein addition instructions have not been detected (NO in step S505), the system control unit 50 advances the processing to step S506.

In step S514, the system control unit 50 performs processing for newly adding a trimming frame. The system control unit 50 newly may set a trimming frame by the same processing as with the first embodiment, according to the operations by the user. Note that the system control unit 50 stores the newly set trimming frame, for example, in the memory 30 in a correlated manner with the trimming candidate frame displayed in a selected state, i.e., the N'th trimming candidate frame.

In step S506, the system control unit 50 determines whether or not display instructions of the trimming frame correlated with the N'th trimming candidate frame by the user have been detected (e.g., performs the function of a display instructions detecting unit). In a case wherein the instructions have been detected (YES in step S506), the system control unit 50 advances the processing to step S507. In a case wherein the instructions have not been detected (NO in step S506), the system control unit 50 advances the processing to step S513. Note that, even in a case wherein selection of display of the trimming frame has been detected, if there is no trimming frame correlated with the N'th trimming candidate frame, the system control unit 50 advances the processing not to step S507, but to step S513.

In step S513, the system control unit 50 adds 1 to the N to display the next trimming candidate frame in a selected state, and returns the processing to step S502.

In step S507, the system control unit 50 sets Nx to 1.

Next, in step S508, the system control unit 50 determines whether or not the Nx'th trimming frame is stored. In a case wherein the Nx'th trimming frame is not stored (NO in step S508), the system control unit 50 returns the processing to step S507, and displays the first trimming frame in a selected manner. In a case wherein the Nx'th trimming frame is stored (YES in step S508), the system control unit 50 advances the processing to step S509.

In step S509, the system control unit 50 displays the Nx'th trimming frame in a selected manner. For example, in the case of displaying the trimming frame correlated with the first trimming candidate frame, the system control unit 50 displays such a trimming frame 1001 as shown in FIG. 10.

Next, in step S510, the system control unit 50 determines whether or not modification of the trimming region of the selected trimming frame has been detected. In a case wherein modification has not been detected (NO in step S510), the system control unit 50 advances the processing to step S511. In a case wherein modification has been detected (YES in step S510), the system control unit 50 advances the processing to step S515.

In step S511, the system control unit 50 determines whether or not display instructions of the trimming candidate frame by the user have been detected (e.g., performs the function of a display instructions detecting unit). In a case wherein display instructions of the trimming candidate frame have been detected (YES in step S511), the system control unit 50 returns the processing to step S502, and performs display of the trimming candidate frame. In a case wherein display instructions of the trimming candidate frame have not been detected (NO in step S511), the system control unit 50 advances the processing to step S512.

In step S512, the system control unit 50 determines whether or not the trimming frame displayed in a selected state has been determined as the trimming region. In a case wherein determination is made that the trimming frame displayed in a selected state has been determined as the trimming region (YES in step S512), the system control unit 50 ends the processing of the flowchart shown in FIG. 12, and returns to the processing of the flowchart shown in FIG. 3. In a case wherein the trimming frame displayed in a selected state has not been determined as the trimming region (NO in step S512), the system control unit 50 advances the processing to step S516.

In step S516, the system control unit 50 adds 1 to the Nx, and returns the processing to step S508. In step S508, the system control unit 50 determines whether or not the next trimming frame is stored, i.e., whether or not the Nx'th trimming frame is stored in a correlated manner with the N'th trimming candidate frame.

Thus, according to the present embodiment, the system control unit 50 can readily switch a case wherein the trimming candidate frame is displayed according to the user's instructions, and a case wherein the trimming frame correlated with the trimming candidate frame is displayed. Accordingly, the user can readily distinguish the trimming candidate frame or trimming frame, and can readily select a frame to be operated. Further, even in the case of newly adding a trimming frame, the user can modify this frame by employing the remaining trimming candidate frame information. That is to say, multiple different trimming frames can be set based on a common trimming candidate frame, which is convenient, for example, even in a case wherein the sizes of the trimming frames are each changed slightly.

Now, let us say that in a case wherein a trimming frame is set so as to include multiple trimming candidate frames, the trimming frame is recorded in a correlated manner with the multiple trimming candidate frames.

Subsequently, after each of the trimming candidate frames is selected, the trimming frame is displayed in a selected manner. Specifically, a trimming frame including two trimming candidate frames is selected twice in the case of selecting a trimming candidate frame while switching the trimming candidate frames.

Note that, with the above-mentioned embodiment, when generating a trimming candidate frame, description has been made regarding the case of employing face information, but a detection method other than face detection may be employed. For example, when setting a trimming candidate frame, a trimming candidate frame may be determined by a method other than face detection. Also, with the above-mentioned embodiment, when describing region instructions, description has been made regarding the case of employing the trimming function, but the present invention is not restricted to this case, i.e., the trimming function, as long as the employed function performs region instructions.

Also, with the above-mentioned embodiments, description has been made assuming that the digital camera 100 is employed, but an image display apparatus having no image-pickup function, such as a PC (Personal Computer) or the like may also be employed. This is because the features of the present invention are a technique adapted to a case wherein a trimming region is instructed by the user's operations, and the instructed range is recorded as an image.

Also, the digital camera 100 according to the above-mentioned embodiments includes digital cameras which record digital image data in a digital storage medium (e.g., memory medium such as EEPROM, hard disk, or the like). The digital cameras include, for example, digital movie cameras, digital still cameras, multifunction devices thereof, and so forth.

In one embodiment, each unit making up the above-mentioned image editing apparatus according to the embodiments of the present invention, and each step of the above-mentioned image emitting method, can be realized by a program having computer-executable instructions that are contained on a computer readable medium, such as stored in the RAM or ROM or the like of a computer being operated. Accordingly, aspects of the invention relate to the computer readable recording medium and the instructions contained thereon.

Also, aspects of the present invention may be applied to embodiments serving as a system, apparatus, method, program, recording medium, and so forth, such as for example an apparatus made up of a single instrument.

Note that in one embodiment according to the present invention, computer-executable instructions contained on the computer readable medium for realizing the functions of the above-mentioned embodiments may be directly or remotely supplied to a system or apparatus. Furthermore, embodiments of the present invention include a case wherein the functions of the above-mentioned embodiments are achieved by a computer of the system or apparatus thereof reading and executing the supplied computer-executable instructions contained by the computer readable medium.

Accordingly, the computer readable medium having the computer-executable instructions itself to be installed in the computer, may realize the function of processing according to embodiments of the present invention at the computer, and may thus also realize aspects of the present invention. That is to say, embodiments of the present invention also include the computer readable medium itself having the computer-executable instructions for realizing the function processing of the present invention. In this case, the computer-executable instructions that may make up a program stored on the computer readable medium may be provided in any format, as long as the computer-executable instructions have program functions, such as object codes, a program executed by an interpreter, script data to be supplied to an OS, or the like.

Also, in one version, a computer executes reading of a program having the computer-executable instructions contained on the computer readable medium, thereby realizing functions of the above-mentioned embodiments. Further, the OS or the like running on a computer may perform a part or all of the actual processing based on the computer-executable instructions, and the functions of the above-mentioned embodiments may also be realized by the processing thereof.

Furthermore, according to another embodiment thereof, first, the program having the computer executable instructions read out from a computer readable medium is written in memory included in, for example, a function expansion board inserted into a computer or a function expansion unit connected to a computer, with a CPU or the like included in the function expansion board or function expansion unit thereof subsequently performing a part or all of the actual processing based on instructions of the program thereof, and thus aspects of the functions of the above-mentioned embodiments may also be realized by the processing thereof.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2008-011946 filed Jan. 22, 2008, which is hereby incorporated by reference herein in its entirety.

What is claimed is:

1. An image editing apparatus comprising:
   a subject frame setting unit configured to set subject frames in an image by correlating the subject frames with each of a plurality of subjects in the image in a case where there are a plurality of subjects in the image;
   a subject frame selecting unit configured to select either of the plurality of subject frames set by the subject frame setting unit;
   a subject frame changing unit configured to change a size or a position of the subject frame selected by the subject frame selecting unit;
   a storage processing unit configured to store, in a storage unit, the subject frames set by the subject frame setting unit and a subject frame of which a size or a position is changed by the subject frame changing unit in correlation with the subject frame which is before changing and selected by the subject frame selecting unit; and
   a display control unit configured to display the image, wherein
       a first subject frame is superimposed over the image;
       a second subject frame is superimposed over the image, wherein a single copy of the image is displayed;
       during a first time period the first subject frame is displayed as selected and other subject frames are not displayed as selected;
       during a second time period which does not overlap with the first time period, the second subject frame is displayed as selected and other subject frames are not displayed as selected; and
       the subject frame of which a size or a position is changed by the subject frame changing unit in correlation with the subject frame which is before changing and selected by the subject frame selecting unit.

2. The image editing apparatus according to claim 1, wherein, in a case where a determining unit determines that a region instructions frame is not stored in a correlated manner with the subject frame, a display control unit displays the subject frame in a selected state, and then displays a different subject frame in the selected state.

3. The image editing apparatus according to claim 1, further comprising:
   a selection detecting unit configured to detect selection of the subject frame or a region instructions frame;
   a display control unit that sequentially displays the subject frame or the region instructions frame in a selected state according to selection detected by the selection detecting unit.

4. The image editing apparatus according to claim 1, further comprising:
   a display control unit configured to display the subject frame or a region instructions frame; and
   a display instructions detecting unit configured to detect display instructions for displaying the region instructions frame stored in a correlated manner with the subject frame;
   wherein, in the case of the display instructions detecting unit detecting the display instructions, the display control unit displays the region instructions frame correlated with the subject frame.

5. The image editing apparatus according to claim 1, wherein the subject information is face information of the subject.

6. The image editing apparatus according to claim 1, wherein the storage processing unit newly stores the subject frame of which a size or a position is changed by the subject frame changing unit in the storage unit, in distinction from the subject frame which is before changing.

7. The image editing apparatus according to claim 1, wherein the subject frame selecting unit is capable of switching, among the plurality of subject frames, the subject frames to be selected in a predetermined order, and in a case where the storage processing unit stored the subject frame, in the storage unit, of which a size or a position are changed in correlation with the subject frame before changing, the subject frame selecting unit selects the subject frame of which a size and a position are changed subsequent to the subject frame before changing.

8. The image editing apparatus according to claim 1, wherein the subject is a human's face.

9. The image editing apparatus according to claim 1, wherein additional subject frames are superimposed over the image.

10. The image editing apparatus according to claim 1, wherein the selection of a subject frame is indicated by a heavy frame or by a color which is different from other subject frames.

11. The image editing apparatus according to claim 1, wherein:
    during the first time period the subject frame changing unit provides the capability to change the size and the position of the first subject frame; and
    during the second time period the subject frame changing unit provides the capability to change the size and the position of the second subject frame.

12. An image editing method comprising:
    setting subject frames in an image by correlating the subject frames with each of a plurality of subjects in the image in a case where there are a plurality of subjects in the image;
    selecting either of the plurality of subject frames;
    changing a size or a position of the subject frame; and
    storing the set subject frames and a subject frame of which a size or a position is changed in correlation with the subject frame before it was changed; and displaying the image, wherein
a first subject frame is superimposed over the image;
a second subject frame is superimposed over the image, wherein a single copy of the image is displayed;
during a first time period the first subject frame is displayed as selected and other subject frames are not displayed as selected;
during a second time period which does not overlap with the first time period, the second subject frame is displayed as selected and other subject frames are not displayed as selected; and
the subject frame of which a size or a position is changed in correlation with the subject frame which is before changing and selecting.

13. A non-transitory computer readable medium containing computer-executable instructions to enable an image processing method to be realized by a computer reading and executing the instructions, the computer readable medium comprising:
computer-executable instructions for setting subject frames in an image by correlating the subject frames with each of a plurality of subjects in the image in a case where there are a plurality of subjects in the image;
computer-executable instructions for selecting either of the plurality of subject frames;
computer-executable instructions for changing a size or a position of the subject frame; and
computer-executable instructions for storing the set subject frames and a subject frame of which a size or a position is changed in correlation with the subject frame before it was changed; and
computer-executable instructions for displaying the image, wherein
a first subject frame is superimposed over the image;
a second subject frame is superimposed over the image, wherein a single copy of the image is displayed;
during a first time period the first subject frame is displayed as selected and other subject frames are not displayed as selected;
during a second time period which does not overlap with the first time period, the second subject frame is displayed as selected and other subject frames are not displayed as selected; and
the subject frame of which a size or a position is changed in correlation with the subject frame which is before changing and selecting.

* * * * *